Feb. 11, 1969   R. W. KISH   3,427,067
AUTOMOBILE REAR WINDOW DEFLECTOR
Filed Dec. 23, 1966
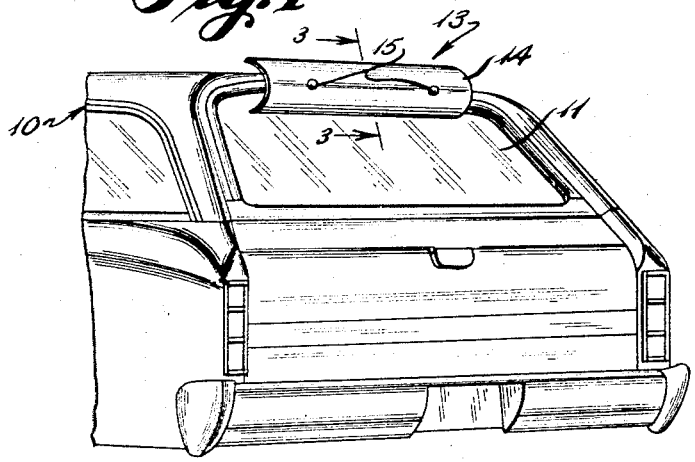
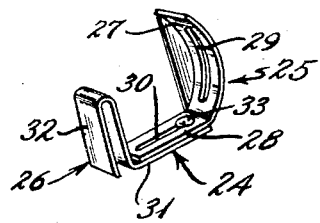
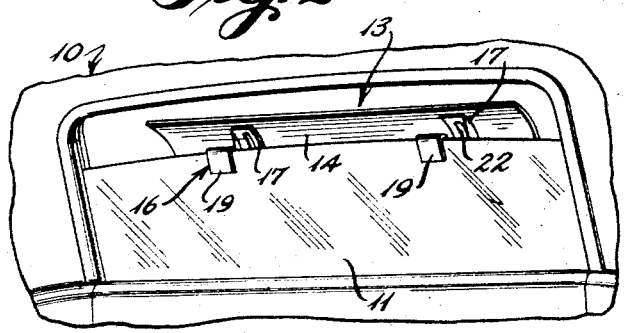
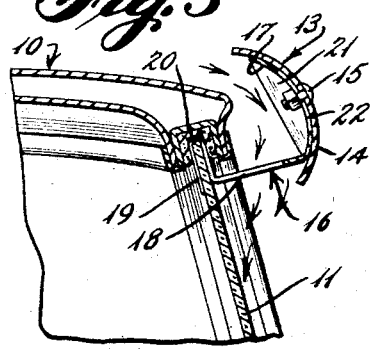
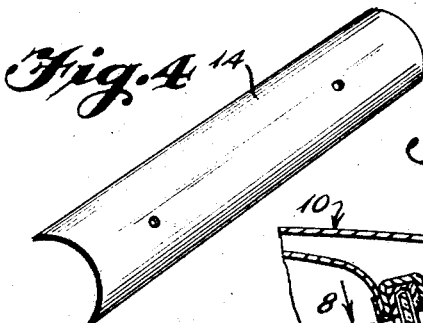
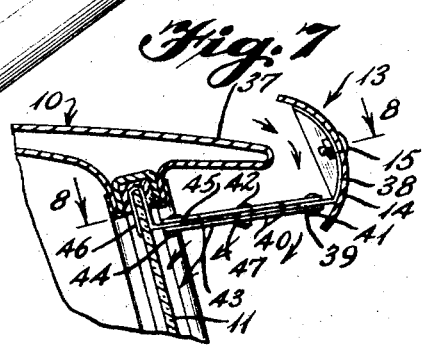
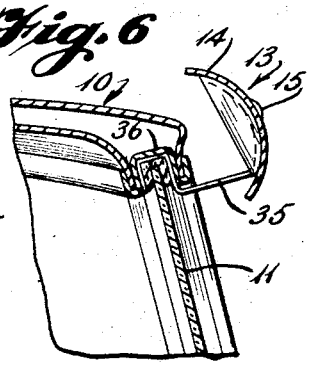
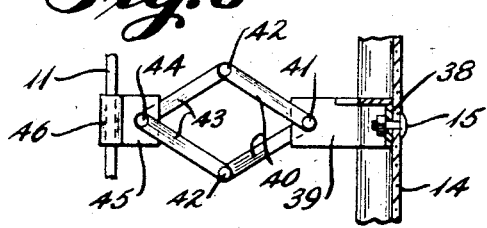
INVENTOR
ROBERT W. KISH
BY
ATTORNEYS

United States Patent Office 3,427,067
Patented Feb. 11, 1969

3,427,067
AUTOMOBILE REAR WINDOW DEFLECTOR
Robert W. Kish, 403 N. Abbe Road,
Elyria, Ohio 44035
Filed Dec. 23, 1966, Ser. No. 604,298
U.S. Cl. 296—1          3 Claims
Int. Cl. B60j 1/20

ABSTRACT OF THE DISCLOSURE

A wind deflector apparatus mounted on an automobile by friction alone and having an adjustable wind scoop mounted on an adjustable bracket.

---

This invention relates generally to the moving of air currents and to the directing of such air currents to a particular place. The invention relates particularly to a deflector mounted on the rear window of an automobile of either the station wagon or sedan type and adapted to direct a current of air against such window to remove loose particles therefrom.

Heretofore air deflectors of many types and sizes have been provided for attachment to various places on an automobile for many purposes including the introduction of air into the automobile, the directing of air away from the vehicle, the reduction of noise created by the passage of air around the vehicle and for various other purposes. However, these prior air deflectors have not been entirely satisfactory since they have been expensive to produce and maintain and most of them must be attached by screws or other fasteners which required holes to be drilled in the body of the automobile. Also some of the prior devices have been mounted on the rain gutter or other undesirable location and accordingly have been ineffective, particularly in areas where there is no gutter.

It is an object of the invention to provide an air deflector which can be mounted on an automotive vehicle without screws or other fasteners and which deflectors can be adjusted to regulate the amount of air flow.

Another object of the invention is to provide a deflector for an automobile which can be adjusted toward and from the automobile so that the deflector can be located adjacent to the automobile or spaced therefrom.

A further object of the invention is to provide a deflector which can be mounted on an automobile without fasteners and which will direct an air current against a window or other surface to remove dirt, dust and other foreign particles therefrom and thereby increase the safety factor in operating the vehicle.

Other objects and advantages of the invention will be apparent from the following description taken in conjunction with the accompanying drawing in which:

FIG. 1, is a rear perspective illustrating one application of the invention;
FIG. 2, a front perspective from inside the vehicle looking rearwardly;
FIG. 3, an enlarged section on the line 3—3 of FIG. 1;
FIG. 4, a perspective of the air deflector per se;
FIG. 5, a perspective of a modified mounting bracket for the deflector of Fig. 4;
FIG. 6, a section similar to FIG. 3 illustrating a further modified form of the invention;
FIG. 7, a section similar to FIG. 3 of a still further modified form of the invention; and,
FIG. 8, a section on the line 8—8 of FIG. 7.

With continued reference to the drawing, an automotive vehicle 10, which may be of the station wagon or sedan type, has a rear window 11 of glass or other transparent material that can be raised or lowered as desired.

Normally when the vehicle 10 is travelling in a forward direction the air through which the vehicle is passing will be forced over, under and around the vehicle in air currents which vary according to the speed of the vehicle. These air currents follow definite patterns in accordance with the streamlining of the vehicle. However, in most vehicles there is a buffer zone in front and a low pressure area or partial vacuum directly behind the vehicle. The front and side surfaces of the vehicle are subjected to air under pressure which has a tendency to remove dirt, dust and other foreign particles therefrom; however, the rear of the vehicle with the low pressure area tends to cause the dust and particles to swirl and eddy into the same and to cling to the vehicle.

The streamlining effect of some automobiles will permit air currents to flow over the rear exposed windows to remove loose dirt, dust and other foreign particles; however, with certain types of vehicles, such as station wagons which have a relatively square rear end, the rear windows are located within the low pressure area where the eddies will deposit additional particles on the windows obscuring vision through the same.

In order to direct a current of air against the rear window 11 an air deflector assembly 13 is provided which is mountable on the rear of the vehicle and adapted to extend substantially entirely across the same. A portion of the deflector asembly can be disposed above the top of the vehicle in the stream of air moving rearwardly to scoop air out of the stream and direct such air against the rear window. The deflector assembly includes an elongated scoop or shield 14 having a generally arcuate cross-section and such scoop is mounted by fasteners 15 on brackets 16. As illustrated a pair of brackets are provided, one connected adjacent each end of the scoop 14; however, if desired a single elongated bracket could be provided of a length to support the scoop in spaced locations.

With reference to FIGS. 1–3, a pair of brackets 16 are provided and each of such brackets has an arcuate end portion 17 connected to an intermediate portion 18 and the opposite end of such intermediate portion terminates in an inverted U-shaped clip-forming portion 19. The legs of the U-shaped portion 19 are generally parallel with each other and spaced apart a distance slightly less than the thickness of the rear window 11 and are adapted to grippingly engage the same when the deflector assembly is mounted on the automobile. The bracket 16 preferably is made from sheet material and at least the U-shaped portion 19 is sufficiently thin that when the window is raised such U-shaped portion will be received within the felt anti-rattle liner 20 of the automobile. The arcuate end portion 17 may be provided with a brace 21 along at least one side of the bracket to impart additional rigidity thereto.

If desired the arcuate portion 17 may have an elongated slot 22 along its length within which the fastener 15 is located so that the scoop 14 may be adjusted along the length of the arcuate portion to vary the amount and direction of flow of the air currents. After the scoop is in the desired position the fasteners 15 may be tightened to retain the scoops in the adjusted position.

With reference to FIG. 5 a modified bracket 24 is provided which is substantially identical with the bracket previously described except that the bracket is formed of two separate and independent cooperating members 25 and 26. The member 25 includes an arcuate end portion 27 connected at one end to a flattened portion 28. The arcuate end portion 27 may have an elongated slot 29 in which a scoop fastener is adjustably received and the flattened portion 28 may have an elongated slot 30 for a purpose which will be described later. The member 26 is provided with a flattened portion 31 which terminates in an inverted U-shaped clip-forming portion 32 by which the bracket 24 is mounted on the automobile 10. The flattened portion 31 may have an opening (not shown) for the reception of a fastener 33 which extends through the slot 30 of the cooperating member 25 so that when the fastener 33 is loosened the members 25 and 26 can be moved relative to each other and thereafter fixed in adjusted position when the fastener is tightened.

With reference to FIG. 6 a bracket 35 is provided for mounting a scoop 14 and such bracket is similar in construction to bracket 16 except that the legs of the U-shaped portion 19 are farther apart and are adapted to be received within the recess 36 for the felt liner 20. In this modification the brackets are mounted directly to the body of the automobile by removing the felt liner and inserting the U-shaped portion within the recess and thereafter replacing the felt liner within such U-shaped portion. With this structure the rear window can be raised and lowered without altering the position of the deflector assembly. It will be noted that the U-shaped portion will have sufficient resiliency to frictionally engage the recess and hold the bracket in position, even though the rear window has been lowered.

With reference to FIGS. 7 and 8 a further modified form of bracket is provided to accommodate vehicles having a relatively long overhang 37. In this modification the bracket includes an arcuate end portion 38 which terminates in an inwardly extending flange 39. A pair of links 40 are pivotally connected at one end to the flange 39 by a pivot pin 41 with one of such links being located above such flange and the other link being located therebelow. The opposite ends of the links 40 are connected by pivots 42 to a second pair of links 43, the opposite ends of which are connected by a pivot pin 44 to the upper and lower surfaces of a flange 45. The flange 45 is generally in alignment with the flange 39 and is connected to an inverted U-shaped clip-forming portion 46 which may either frictionally engage the rear window 11 or may be received within the recess 36 in the body of the automobile. In this modification the ends of the links 43 which are connected by the pivots 42 may be separated by spacers 47 and such pivots may be in the form of a nut and bolt which when tightened will retain the scoop 14 in fixed adjusted position.

It will be apparent that a relatively simple deflector has been provided which can be mounted on the rear window of a vehicle or can be mounted on the rear portion of the body of the vehicle and adapted to remove air from the currents passing over the top of the vehicle, and direct such air against the rear window so that when such air impinges upon the window dirt, dust and other loose particles will be removed to permit better vision and thereby insure safer operation of the vehicle.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An air deflector for an automobile having a rear window capable of being raised and lowered, said deflector comprising an elongated generally arcuate scoop having a portion extending above the top of said automobile and adapted to direct a current of air against said rear window when the vehicle is moving in a forward direction, bracket means mounting said scoop on the rear of said automobile, said bracket means including a generally arcuate end portion of a configuration complementary to said scoop, an intermediate portion and an inverted U-shaped end portion, fastener means for adjustably mounting said scoop on said arcuate portion, said intermediate portion being adjustable to control the distance between the rear of said automobile and said scoop, and said U-shaped end portion engaging at least one portion of said automobile and mounting said deflector thereon solely by friction, whereby said scoop will direct a current of air from above said vehicle against said rear window to remove loose particles therefrom.

2. The structure of claim 1 in which said intermediate portion includes a pair of cooperating flattened portions, at least one of said flattened portions having an elongated slot, and fastening means in said slot, whereby said flattened portions can be adjusted relative to each other and thereafter fixed in adjusted position.

3. The structure of claim 1 in which said intermediate portion includes link means pivotally connecting said arcuate end portion and said U-shaped end portion.

References Cited

UNITED STATES PATENTS

| | | | |
|---|---|---|---|
| 2,478,161 | 8/1949 | Russell | 296—154 X |
| 3,015,518 | 1/1962 | Nelson | 296—91 |
| 3,089,728 | 5/1963 | Shumaker | 296—1 |
| 3,059,562 | 10/1962 | Sturtevant | 296—91 X |
| 3,010,754 | 11/1961 | Shumaker | 296—91 X |

PHILIP GOODMAN, *Primary Examiner.*

U.S. Cl. X.R.

296—91